United States Patent [19]
Epps

[11] Patent Number: 5,836,104
[45] Date of Patent: Nov. 17, 1998

[54] FLYING INSECT TRAP

[76] Inventor: Alan L. Epps, Rte. 1, Box 209, McAlester, Okla. 74501

[21] Appl. No.: 773,925

[22] Filed: Dec. 30, 1996

Related U.S. Application Data

[60] Provisional application No. 60/009,561, Jan. 3, 1995.
[51] Int. Cl.$^6$ ..................................................... A01M 1/10
[52] U.S. Cl. ................................................................ 43/122
[58] Field of Search ........................................ 43/107, 122

[56]        References Cited

U.S. PATENT DOCUMENTS

| | | | |
|---|---|---|---|
| 1,491,845 | 4/1924 | Christal . | |
| 1,941,659 | 1/1934 | Coleman | 43/122 |
| 4,244,135 | 1/1981 | Harwoods | 43/122 |
| 4,476,647 | 10/1984 | Hall, Jr. | 43/122 |
| 4,505,065 | 3/1985 | Niemeyer | 43/107 |
| 4,706,410 | 11/1987 | Briese . | |
| 4,718,193 | 1/1988 | Rosselli . | |
| 5,682,706 | 11/1997 | Altenburg | 43/122 |

OTHER PUBLICATIONS

The Use of Traps Against Tsetse in West Africa.; K.R.S. Morris, D.Sc.; *Medical Entomologist, Gold Coast,* and M.G. Morris, B.Sc., Ph.D., pp. 491–528.

*Mosquito News* vol. 36, No.4 *The Comparative Efficiency of Six Traps Types for the Collection of Tabanidae (Diptera);* R.H. Roberts pp. 530–535.

The Orientation Behaviour of Horse Flies and Deer Files (Tabanidae, Diptera). *Ent.exp & appl. 8 (1965) North Holland Publishing Co., Amsterdam* pp. 189–192.

A Portable Stable Trap for Capturing Mosquitos by: E.H. Magoon (Plate XV) pp.363–371.

Southwestern Entomologist Dec. 1996 No. 20, "The Horse and Deer Files" by Goodwin and Drees; *Collection, Handling and Preservation.*

*Primary Examiner*—Thomas Price
*Attorney, Agent, or Firm*—Fellers, Snider, Blankenship, Bailey & Tippens, P.C.

[57]        ABSTRACT

A passive, environmentally friendly apparatus and method for exterminating flying insects, particularly horseflies, without the use of chemical attractants or baits. A transparent deflector deflects the flying insects into a trap for extermination. A plurality of opaque targets are positioned about the deflector and trap so as to direct the flying insects into the deflector.

17 Claims, 4 Drawing Sheets

FLYING INSECT TRAP

CROSS REFERENCE TO RELATED APPLICATION

This application claims the benefit of U.S. provisional application Ser. No. 60/009,561 filed Jan. 3, 1995.

BACKGROUND OF THE INVENTION

1. Field of the Invention

The present invention relates generally to an apparatus for catching flying insects, specifically horseflies. More particularly, the invention relates to an apparatus having a unique arrangement of targets that direct the insects into a transparent impact panel. Upon impact the insects are downwardly deflected into a liquid, where they subsequently drown.

2. Background

The damage caused by biting insects, particularly horseflies, is significant. Horseflies are insects of a family (Tabanidae) of swift, usually rather stocky, two-winged flies, the female having a piercing proboscis. The females use the proboscis to suck the blood of animals (typically horses and cattle, but sometimes humans) inflicting painful bites and spreading disease.

In the past, poisons have been used to control insects. However, the use of poisons is not favored due to their deleterious effects on the environment and the possibility of killing potentially beneficial insects.

As an alternative to poison, many prior patents teach devices or traps to catch insects. For example, U.S. Pat. No. 1,941,659 to Coleman and U.S. Pat. No. 4,706,410 to Briese are designed to lure and catch insects known as Japanese beatles. U.S. Pat. No. 4,505,065 to Niemeyer is designed to catch flying forest insects, particularly bark beatles. U.S. Pat. No. 4,718,193 to Rosselli is designed to catch flies. German Offenlegungsschraft No. 2,924,629 is also designed to catch flying insects.

All of the above listed patents rely upon attractants, such as pheromones, which are insect-produced volatile compounds. The requirement of an attractant to lure the insects into the trap is disadvantageous. Sophisticated traps using pheromones require a user to acquire and administer the pheromones. Presumably, as the attractant ages, its effectiveness will diminish, and the attractant will have to be replaced with fresh pheromones in order to continue to attract insects to the trap.

Other disadvantages with the use of attractants are apparent such as in Rosselli's trap for flying insects. Rosselli teaches using a bait to draw the insects into the trap, the preferred bait being fish gut. The obvious disadvantage of this method is that the attractant is foul smelling.

Several of the above-listed patents teach directing the insects into a cone that is designed to funnel the insects into a receptacle. The use of a cone allows agile insects an opportunity to escape the receptacle. While such cones may be effective in trapping beatles, which are not agile, horseflies would be significantly more difficult to direct through a funnel.

Consequently, a passive insect trapping apparatus that requires no poison, no bait, and that leaves no opportunity for the insects to escape is desired.

SUMMARY OF THE INVENTION

It has been noted that horseflies are attracted to free standing objects. It has further been observed that horseflies have a tendency to circle such an object at a relatively high speed before attempting to land on the object.

It is therefore an object of this invention to take advantage of the above tendencies exhibited by horseflies and to provide a passive trapping apparatus for catching and killing horseflies.

It is another object to provide a trapping apparatus that does not require the use of chemical attractants or other types of bait to attract the insects.

It is a further object to provide a trapping apparatus that is remarkably successful in catching horseflies, but has no features or components that are harmful to the environment, humans or livestock.

These and other objects are achieved by an apparatus constructed of commonly available materials in such a way as to attract flying insects, e.g. horseflies, and steer them into a transparent deflector which deflects them into a soapy water trap or alternative environmentally friendly means to exterminate them. In the preferred embodiment, the invention is comprised of an upper panel or "target" and a lower panel or "target" that span between left and right support members. Also spanning between the left and right support members, and positioned between the upper and lower targets, is a deflector, preferably a transparent impact surface comprised of first and second glass panes arranged in a synclinal relationship. Provided below the glass panes is a trap, preferably a tray having an inwardly beveled edge. The tray is filled with a liquid, such as water, and is positioned to receive downwardly deflected insects. Positioned on the outward side of the support members is a side target. In the preferred embodiment, the side targets are not positioned in a co-planar arrangement with the upper and lower targets. Instead, the side targets are positioned parallel to each other at an angle from the above defined plane, oriented to extend out in opposite directions from one another. The apparatus thus appears to form an "S" as might be drawn with three line segments.

In practice, the device is set up in the out-of-doors and a liquid such as water, preferably soapy water, is placed into the tray. Alternatively, the panes of glass can be positioned above a body of water such as a pond. Horseflies are attracted to the device by the large, preferably darkly colored targets. It has been found that shiny black targets are most effective, though not necessary. As the horseflies approach the trap, they have a natural tendency to circle the trap before attempting to land on the structure. As the horsefly circles the structure, the horsefly encounters a side target. The horsefly must either change its course to go around the ends of the target or pass through what appears to be an open area between the upper and lower targets and the left and right support members. It has been found that when the side targets are positioned at an approximately forty-five (45) degree offset from the upper and lower targets the horseflies attempt to pass through the seemingly open area a great majority of the time. This fact accounts for the remarkable success of this device in trapping horseflies. The seemingly open space, which is positioned between the upper and lower targets and the left and right support members, in fact houses the deflector, a transparent impact surface. The transparent impact surface is preferably comprised of glass panes. Experiments have shown that glass panes are superior to plexi-glass panes since the horseflies seem to be able to detect the presence of plexi-glass panes. However, other types of transparent panes may be used. In the preferred embodiment, first and second glass panes are positioned in a synclinal relationship. It has been found that the trap is most effective when the panes are positioned at approximately thirty (30) to fifty (50) degrees above the horizontal. Additionally, the trap is most effective when it is oriented in a north/south direction. As the horseflies attempt to pass through the seemingly open area between the upper and lower targets they impact with the panes and are deflected downwardly into the trap, e.g. the tray of liquid located below the device. If the transparent panes are positioned at an orientation too close to vertical the horseflies have a tendency to bounce off the panes and not be directed into the tray. If the panes are oriented at an angle too close to horizontal, then the seemingly open area between the upper and lower targets must be narrowed accordingly, thereby reducing the likelihood that the horsefly will fly between the upper and lower panes. A narrowing of the space between the upper and lower targets increases the likelihood that the horsefly will fly around the side targets.

In the preferred embodiment, the trap comprises a tray positioned below the glass panes. The tray has beveled edges to prevent the insects from crawling out. If the tray is provided with beveled edges, ordinary water may be used to effectively trap the insects. The insects are unable to escape the tray and subsequently drown. Using soapy water is advantageous insofar as it interferes with the insect's respiration.

In accordance with one aspect of the invention, multiple trays may be used between a single set of support members. In accordance with another aspect of the invention, alternatives to soapy water are employed to exterminate the insects deflected by the glass panes.

The invention also includes the method of exterminating flying insects by using the above described apparatus and a kit containing the components for the device.

A better understanding of the invention and its objects and advantages will become apparent to those skilled in this art from the following detailed description, taken in conjunction with the attached drawings, wherein there is shown and described only the preferred embodiment of the invention, simply by way of illustration of the best mode contemplated for carrying out the invention. As will be realized, the invention is capable of modifications in various obvious respects, all without departing from the invention. Accordingly, the description should be regarded as illustrative in nature and not is restrictive.

DETAILED DESCRIPTION OF THE PREFERRED EMBODIMENTS

Figure 1:
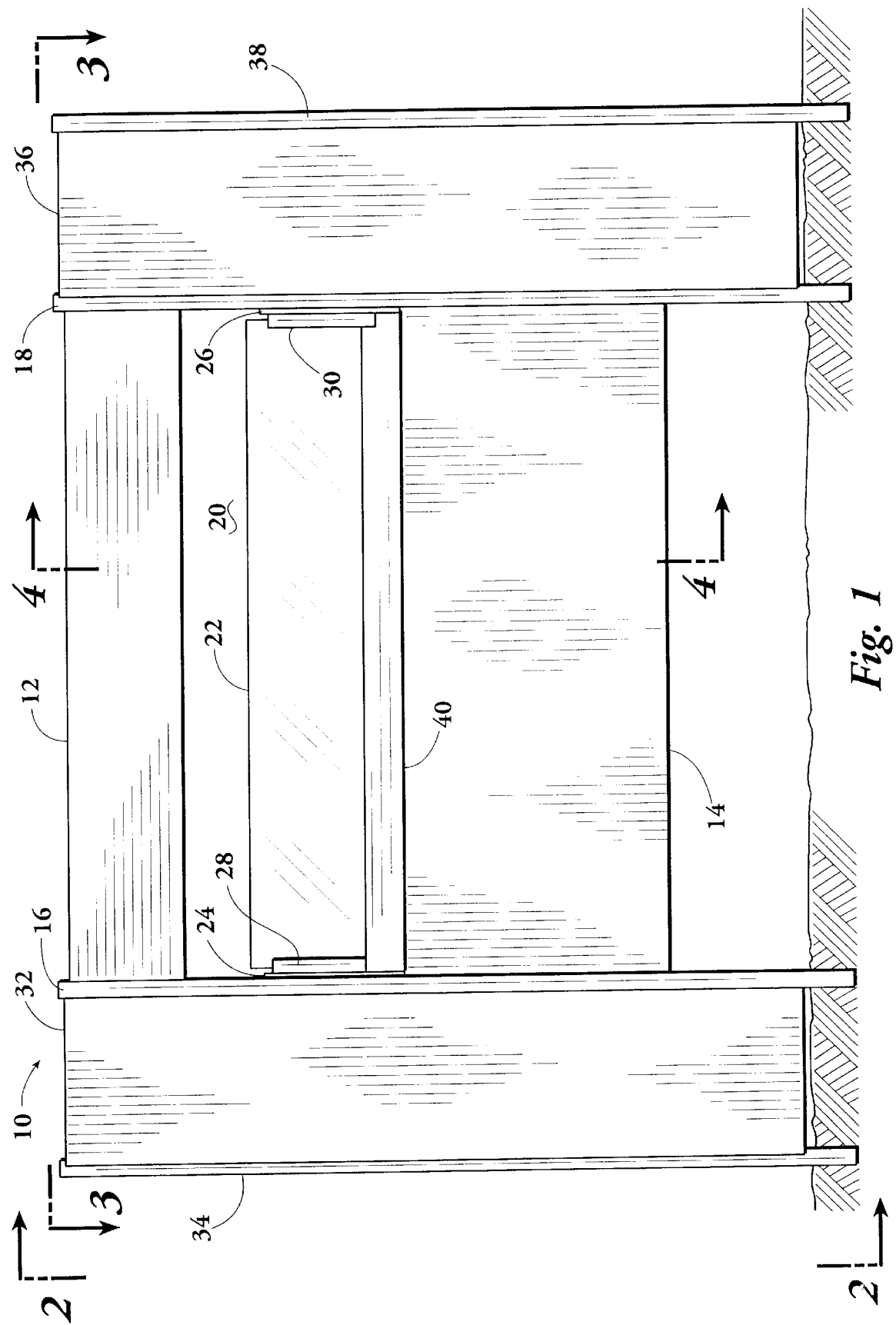
FIG. 1 is a side elevation view of the preferred horsefly trap.

Referring first to FIG. 1, there is shown an insect trapping apparatus designated generally by the reference numeral 10. The apparatus 10 is comprised of an upper target 12 and a lower target 14 that are supported by a left support member 16 and a right support member 18. In the preferred embodiment, the support members 16, 18 extend about five (5) to six (6) feet above the ground and the distance between the two is approximately forty-two (42) inches. The upper target has a height of about one (1) foot and the lower target has a height of about two (2) feet. An open space 20, preferably of a height of twelve (12) to fourteen (14) inches, is provided between upper target 12 and lower target 14 for receiving a deflector, such as a transparent impact surface, preferably a pair of glass panes. A first pane 22 is visible in FIG. 1. Left bracket 24 and right bracket 26 are affixed to left support member 16 and right support member 18 respectively. Brackets 24 and 26 support first left guide 28 and first right guide 30. Guides 28 and 30 support first glass pane 22 and second glass pane 23 (not shown in FIG. 1). Affixed to left support member 16 is left side target 32. In the preferred embodiment, left side target 32 is additionally supported by outer left support member 34. Affixed to right support member 18 is right side target 36. Right side target 36 is further supported by outer right support member 38. The outer support members 34, 38 are similar in height to the left and right support members 16, 18. The side targets 32, 36 are approximately twenty-four (24) inches wide and sixty-six (66) inches tall. Below first and second panes of glass 22 and 23, is a trap in the form of a tray 40 for receiving, deflected insects.

Figure 2:
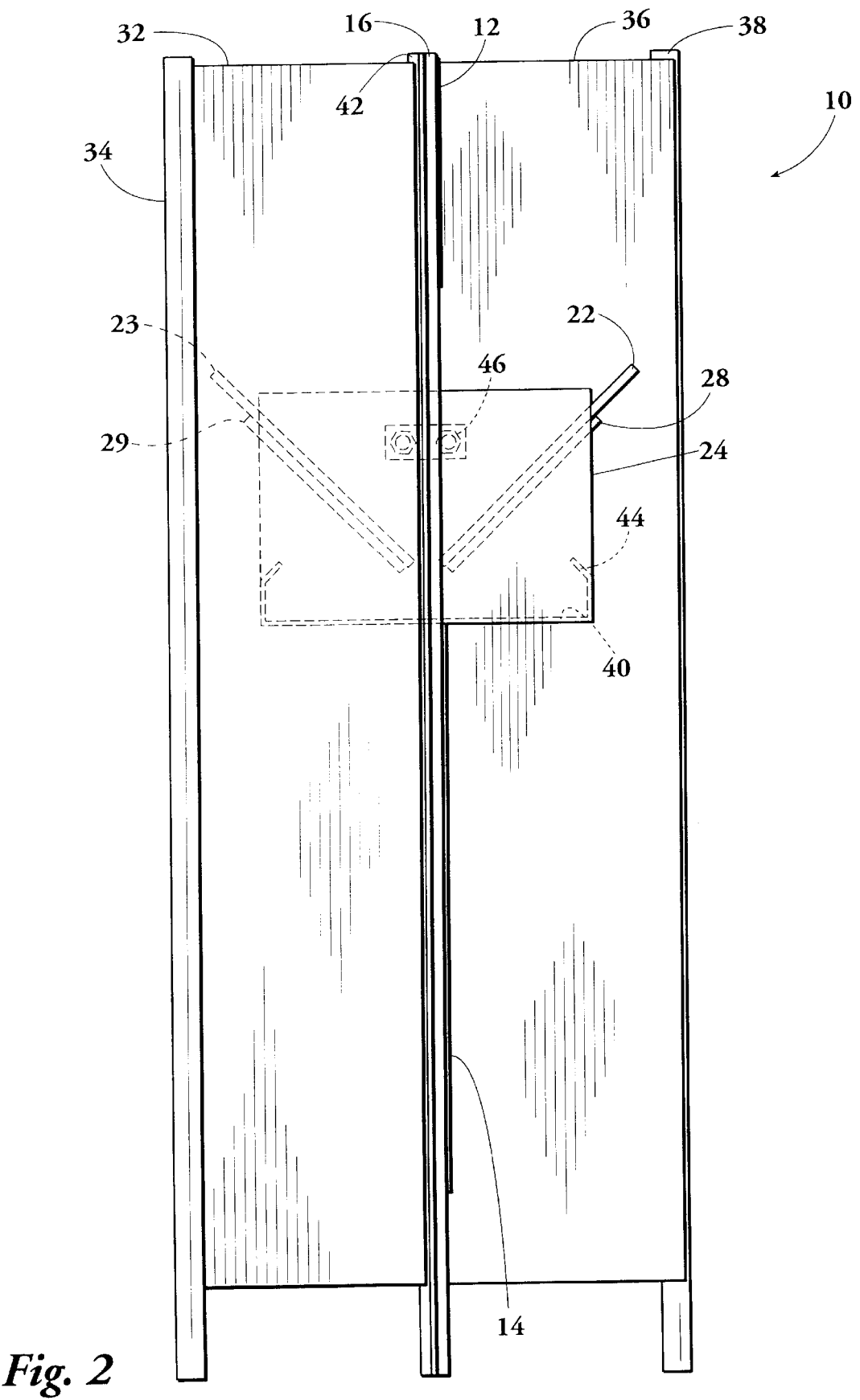
FIG. 2 is an end view taken along line 2—2 of FIG. 1.

Referring now to FIG. 2, an end view of the apparatus 10 is shown. Visible are end views of upper target 12 and lower target 14. Left side target 32 is visible, since it is offset at preferably forty-five (45) degrees from upper target 12 and lower target 14. Outer left support member 34 supports the outside edge of left side target 32. The inside edge 42 of left side target 32 is proximate to left support member 16. Partially visible and partially shown with hatched lines is left bracket 24, which is affixed to first left guide 28 and second left guide 29. First pane of glass 22 and second pane of glass 23 are shown supported by guides 28 and 29. Also affixed to bracket 24 is tray 40, shown in FIG. 2 with hatched lines. An inwardly beveled edge 44 is provided on tray 40 to prevent trapped insects from escaping. A left U-bolt 46 is provided to affix left bracket 24 to left support member 16. Also visible is right side target 36 and outer right support member 38. Right side target 36 is visible because it is offset forty-five (45) degrees from upper target 12 and lower target 14 in an opposite direction from left side target 32. First glass pane 22 and second glass pane 23 are arranged in a synclinal relationship and are preferably set approximately thirty (30) to fifty (50) degrees above the horizontal.

Figure 3:
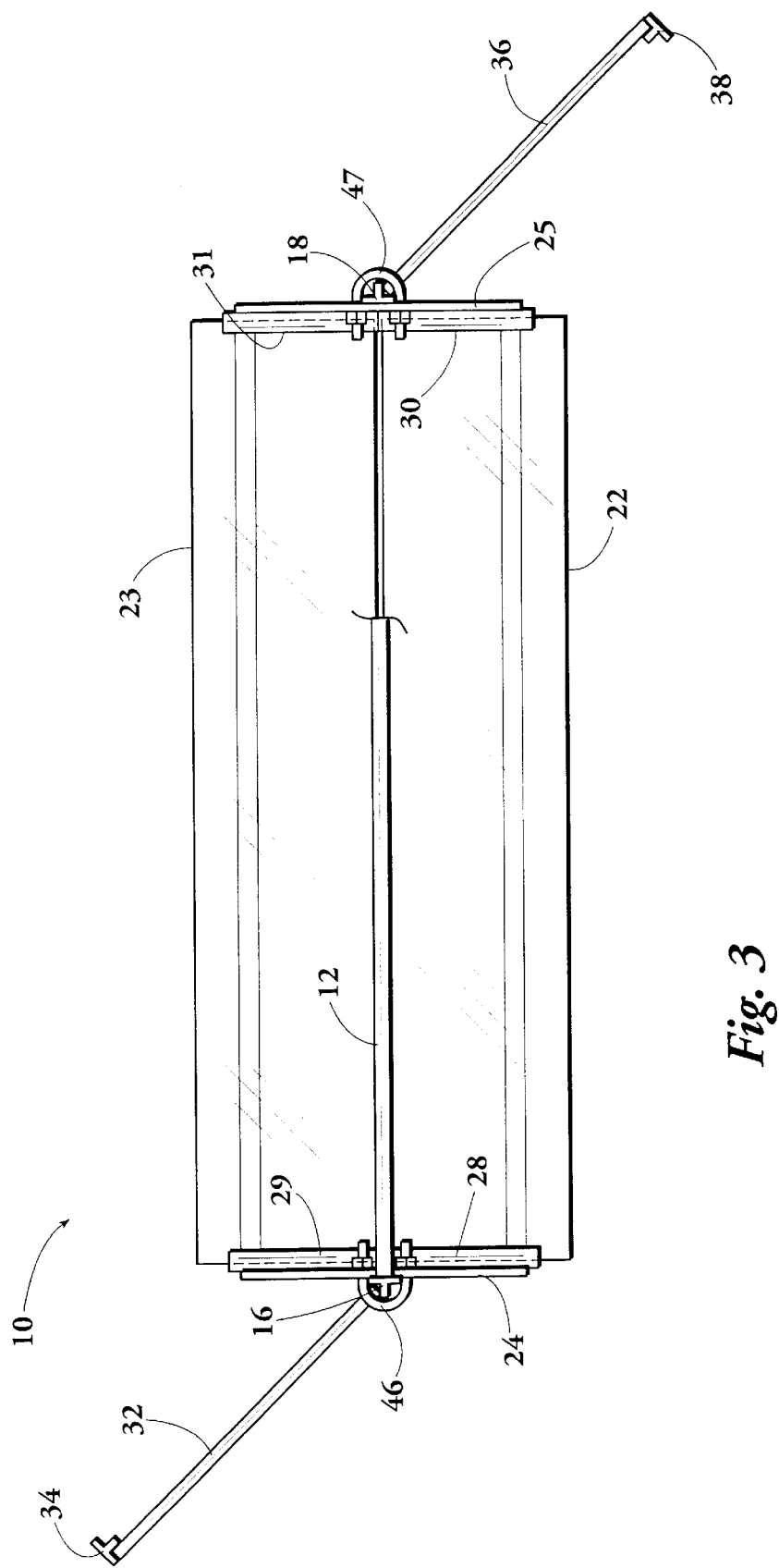
FIG. 3 is a top view taken along line 3—3 of FIG. 1.

FIG. 3 shows a top view of the apparatus 10. FIG. 3 better illustrates how left side target 32 and right side target 36 are angled at about forty-five (45) degrees from upper target 12 and lower target 14. Also, clearly visible is a top view of left support member 16, right support member 18, outer left support member 34 and outer right support member 38. In the preferred embodiment, support members 16, 18, 34, and 38 comprise conventional metal T-bar fence posts.

First glass pane 22 is supported by first left guide 28 and first right guide 30, both of which are respectively mounted, such as by welding, on brackets 24, 26, which brackets, in turn, are affixed to support members 16, 18 by U-bolts 46, 47. Second glass pane 23 is supported by second left guide 29 and second right guide 31, both of which are likewise mounted on brackets 24, 26, which brackets, in turn, are affixed to support members 16, 18 by U-bolts 46, 47.

Figure 4:
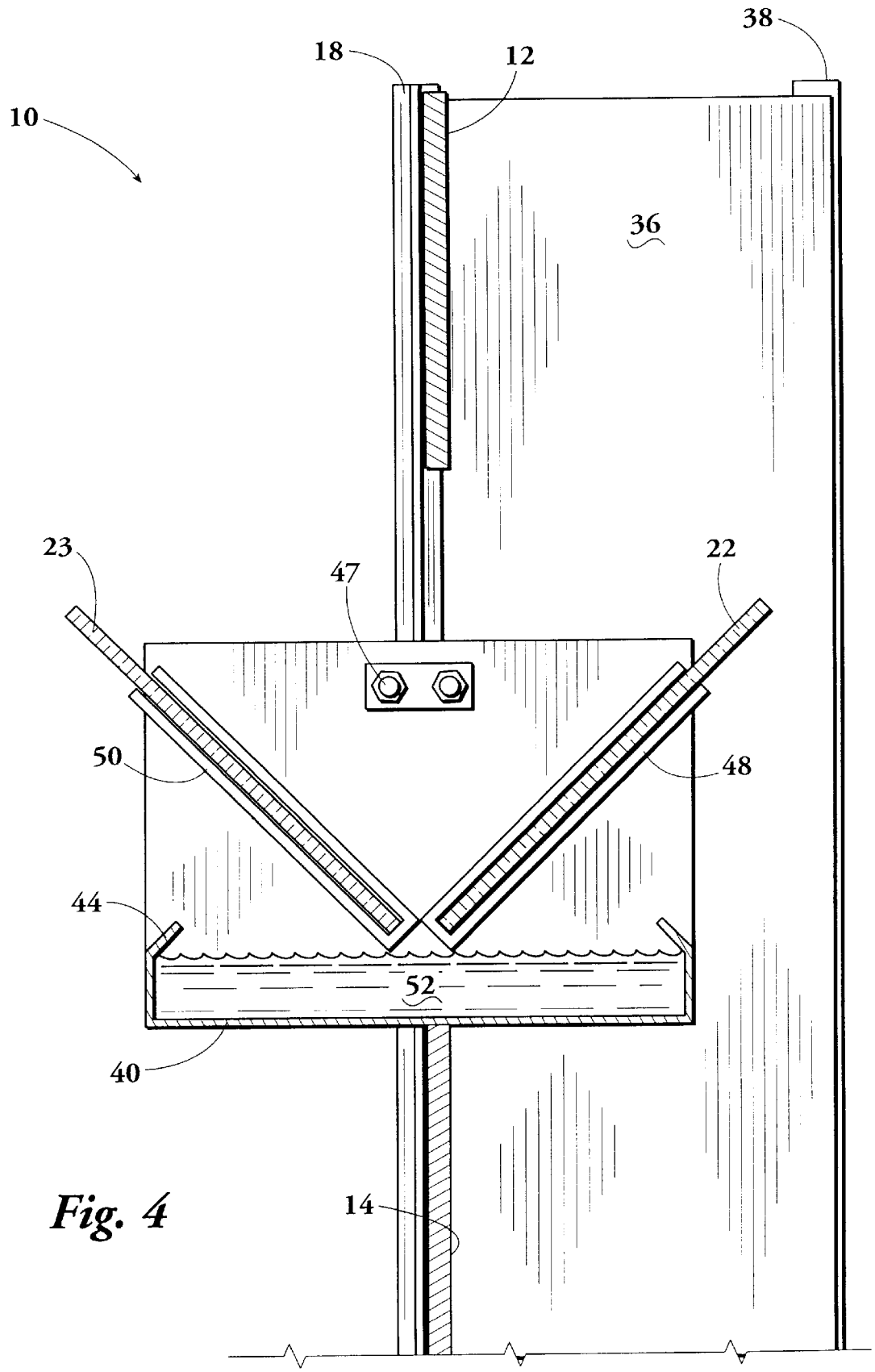
FIG. 4 is a cross sectional view taken along line 4—4 of FIG. 1.

FIG. 4 shows a cross sectional view of the apparatus 10. Shown in FIG. 4 is a second embodiment of guides used to support first glass pane 22 and second glass pane 23. First right U-shaped guide 48 and second right U-shaped guide 50 are shown in FIG. 4 supporting first and second glass panes 22 and 23. However, these guides are shown as examples only, and other configurations of guides would be acceptable. Water 52 is shown in tray 40 and is used to receive deflected insects that impact first glass pane 22 or second glass pane 23. Beveled edge 44 is provided to prevent the insects from climbing out.

In practice, the apparatus 10 is set in the out-of-doors where it can attract insects such as horseflies, preferably in an open field. Before landing on an object, horseflies are known to circle the object. As the horsefly circles the apparatus 10, the horsefly will encounter either right side target 36 or left side target 32. The side targets provide the trap with a large sight line. The angle of offset for left side target 32 and right side target 36 is important. It has been found that an approximately forty-five (45) degree offset is optimal for directing the maximum number of horseflies through the seemingly open area instead of around the side of right or left side targets 32 or 36. Some variation in the offset of side targets 32, 36 is acceptable depending upon the circumstances. If the side targets are set at the appropriate angles, an insect will pass through the seemingly open area between upper target 14 and lower target 16, instead of altering its flight path to circle outside of either right side target 36 or left side target 32. Invisible to the fly, however, is the transparent impact surface provided in the seemingly open area between upper target 14 and lower target 16. The transparent impact surface is preferably comprised of first pane of glass 22 and second pane of glass 23. Preferably, these panes of glass are arranged in a synclinal relationship as shown in FIG. 4 and are set at approximately thirty (30) to fifty (50) degrees above horizontal. If glass panes 22 and 23 are set at the appropriate angle, the horseflies that attempt to pass through the seemingly open area will impact either glass pane 22 or 23 and be deflected downwardly into tray 40 where they subsequently drown in a liquid such as water 50 provided therein. Soapy water is preferred. Beveled edge 44 is provided on the upper surfaces of tray 40 to prevent the insects from escaping.

The preferred materials for use in connection with the present invention include, as described above, dark colored solid target material (although color is not believed to be critical the targets should be opaque), glass panes for the transparent impact surface, sheet metal trays and conventional T-bar metal fence posts for the support members. Painted wood or plastic sheeting will suffice for the target material, along with other similar articles. As mentioned, plexi-glass does not appear to work too well as a substitute for glass, but other glass substitutes, including clear screen wire, may be effective. The tray can be formed with integral brackets and welded glass guides. Any sturdy, upright support post could be used in place of conventional T-bar metal fence posts. It should be understood that the particular materials described herein are for purposes of illustrating acceptable types of materials. They are not limiting in and of themselves.

It is readily evident from the above description that the apparatus can be assembled in a variety of ways. One way includes setting up the trap in a north/south orientation by driving a first T-post into the ground so that five (5) to six (6) feet of the post extends above the ground. The sheet metal tray is then used to measure the required distance for the second T-post. The second post is driven into the ground to achieve the same height as the first T-post. The smooth sides of the T-posts face toward each other to aid in affixing the tray between the posts. The tray is leveled by adding water. After the tray is affixed to between what are now called the tray posts, the upper and lower targets are tied between the tray posts. The outer support members, or target posts, are then driven into the ground approximately two (2) feet from each tray post at an angle of about forty-five (45) degrees, one extending to the northeast and the other toward the southwest from the tray posts. The side targets are hung with four (4) grommets between the target posts and tray posts. The glass panes are then slid into place.

The invention also encompasses using multiple trays between a single set of support members. In a preferred multiple tray arrangement where the trays are set up in a north/south orientation, a metal T-post is driven into the ground leaving approximately 5.5 to 6 feet of post above the ground. The smooth side of the post is for placement next to the tray. A tray is used to measure the distance required for the other supporting T-post, and the second post is driven into the ground as was the first. An upper tray is affixed to the support posts approximately sixteen (16) inches from the top of the T-posts. The tray is leveled by adding water. A one (1) foot target is tied about 4 inches above the tray. A two (2) foot target is tied against the bottom of the tray. A second tray is attached between the posts with the top of the tray one (1) to (2) inches up from the bottom of the two (2) foot target. In other words, the target hangs into the second tray one (1) to two (2) inches. Another T-post is driven level with the other posts about two (2) feet from each tray post. These are placed at a forty-five (45) degree angle, one going northeast and the other southwest from the tray posts. A two (2) foot by five (5) foot side target is hung with four (4) grommets between the outer target posts and the tray posts. The glass panes are slid into place above the trays. It has been observed that with this embodiment, larger horse flies are trapped in the upper tray while smaller flies are captured in the lower tray.

In addition to or instead of a tray filled with soapy water, other alternative traps for exterminating the deflected insects can be used. In one case, a one-quarter inch piece of polyurethane foam is placed inside the tray filled with soapy water so that it floats thereon. The deflected horseflies land on the foam and contact the soapy water contained in the foam, but they are capable of flying off, only to expire later when the soapy water interferes with their respiration. This avoids having to clean out the tray as often. Other traps, such as flypaper, can be used below the glass panes as an extermination mechanism. Though not preferred, chemical attractants or bait could be placed in the tray.

It is also contemplated that a drip tank containing soapy water could be incorporated into the invention, such as replacing a side target with a drip tank or suspending a drip tank along-side a side target, to provide a reservoir of water for the tray.

The invention was independently tested and was found to be successful in exterminating significant numbers of horseflies.

The invention may be sold assembled or in a kit. Likewise, the invention includes the method of exterminating flying insects by assembling the apparatus described in detail above in a suitable horsefly infested location.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A passive, environmentally friendly apparatus for exterminating flying insects, comprising:

(a) a transparent deflector for deflecting the flying insects;

(b) a trap for receiving deflected insects;

(c) a plurality of opaque targets positioned about said deflector and trap so as to direct the flying insects into said deflector, whereby they are deflected into said trap and exterminated, at least one of said targets being in a vertical plane above or below said deflector and trap and at least one other of said targets extending laterally away from said deflector and trap.

2. The apparatus according to claim 1 wherein said deflector comprises a pair of glass pane s synclinally arranged above said trap.

3. The apparatus according to claim 1 wherein said trap comprises a tray containing water.

4. The apparatus according to claim 3 wherein said water is soapy water.

5. The apparatus according to claim 1 wherein said targets include an upper target positioned above said deflector and trap, a lower target positioned below said deflector and trap and two oppositely disposed side targets, each said side target extending laterally away from said deflector and trap and positioned parallel to the other at a like angle with respect to said deflector and trap.

6. The apparatus according to claim 5 wherein said side targets are angled at forty-five degrees.

7. The apparatus according to claim 6 wherein said deflector and trap are aligned along a north/south axis.

8. A passive, environmentally friendly apparatus for exterminating flying insects, particularly horseflies, without the use of chemical attractants or baits, comprising:

(a) two upright support members;

(b) a transparent deflector for deflecting the flying insects extending between said support members;

(c) a trap positioned beneath said deflector extending between said support members;

(d) an upper opaque target positioned above said deflector and extending between said support members;

(e) a lower opaque target positioned below said deflector and extending between said support members;

(f) a first opaque side target extending from one of said upright support members at an angle of about forty-five degrees; and (g) a second opaque side target parallel to said first side target extending from the other of said upright support members at an angle of about forty-five degrees.

9. A method for exterminating flying insects, comprising:

(a) selecting a suitable infested location;

(b) assembling the apparatus of claim 8.

10. A kit containing components for a passive, environmentally friendly apparatus for exterminating flying insects, comprising:

(a) an exterminating trap;

(b) a plurality of opaque targets for positioning about said trap so as to direct the flying insects into said trap, at least one of said targets adapted for positioning in a vertical plane above or below said trap and at least one other of said targets adapted to extend laterally away from said trap.

11. The kit according to claim 10, further comprising a plurality of support members for supporting said trap and said targets.

12. The kit according to claim 11, wherein said trap comprises a transparent deflector and a tray.

13. A passive, environmentally friendly apparatus for exterminating flying insects, comprising:

(a) a central exterminating trap;

(b) a plurality of opaque targets positioned about said trap so as to direct the flying insects into said trap where they are exterminated, at least one of said targets being in a vertical plane above or below said trap and at least one other of said targets extending laterally away from said trap.

14. The apparatus according to claim 13, wherein said exterminating trap comprises a transparent deflector positioned above a tray of soapy water.

15. The apparatus according to claim 13, wherein said targets include an upper target positioned above said trap, a lower target positioned below said trap and two oppositely disposed side targets, each said side target extending laterally away from said trap and positioned parallel to the other at a like angle with respect to said trap.

16. The apparatus according to claim 15 wherein said side targets are angled at forty-five degrees.

17. The apparatus according to claim 16 wherein said trap is aligned along a north/south axis.

\* \* \* \* \*